(12) United States Patent
Schimpe

(10) Patent No.: US 9,742,519 B2
(45) Date of Patent: Aug. 22, 2017

(54) PHOTONIC CROSS-CONNECT WITH RECONFIGURABLE ADD-DROP-FUNCTIONALITY

(71) Applicant: Xieon Networks S.a.r.l., Luxemburg (LU)

(72) Inventor: Robert Schimpe, Ottobrunn (DE)

(73) Assignee: Xieon Networks S.a.r.l., Senningerberg (LU)

( * ) Notice: Subject to any disclaimer, the term of this patent is extended or adjusted under 35 U.S.C. 154(b) by 41 days.

(21) Appl. No.: 14/761,775

(22) PCT Filed: Dec. 13, 2013

(86) PCT No.: PCT/EP2013/076565
§ 371 (c)(1),
(2) Date: Jul. 17, 2015

(87) PCT Pub. No.: WO2014/111212
PCT Pub. Date: Jul. 24, 2014

(65) Prior Publication Data
US 2015/0365186 A1 Dec. 17, 2015

(30) Foreign Application Priority Data
Jan. 18, 2013 (EP) ..................................... 13151917

(51) Int. Cl.
*H04J 14/02* (2006.01)
*H04Q 11/00* (2006.01)

(52) U.S. Cl.
CPC ........ *H04J 14/0212* (2013.01); *H04J 14/021* (2013.01); *H04J 14/0213* (2013.01);
(Continued)

(58) Field of Classification Search
CPC ............... H04J 14/0212; H04J 14/0217; H04J 14/0227; H04J 14/0204; H04J 14/021; H04J 14/0201; H04Q 11/0005
(Continued)

(56) References Cited

U.S. PATENT DOCUMENTS

2003/0152072 A1* 8/2003 Guild ................. H04Q 11/0005
370/386
2008/0056715 A1 3/2008 Akiyama et al.
(Continued)

FOREIGN PATENT DOCUMENTS

EP 2403170 A1 1/2012
WO 2014111212 A1 7/2014

OTHER PUBLICATIONS

European Search Report, EP 13151917.5, dated Jul. 12, 2013, 5 pages.
(Continued)

*Primary Examiner* — Don N Vo
(74) *Attorney, Agent, or Firm* — Nelson Mullins Riley & Scarborough LLP

(57) ABSTRACT

A photonic cross-connect arrangement is presented which is able to cope with the transmission of super-channels, wherein complete super-channels are dropped and added to change a direction of transport. At least a cyclic filter is used in a drop-branch of a cross-connect for dividing a super-channel into sub-channels and/or at least a further cyclic filter is used in an add-branch to configure a super-channel.

11 Claims, 4 Drawing Sheets

(52) U.S. Cl.
CPC . *H04Q 11/0005* (2013.01); *H04Q 2011/0009* (2013.01); *H04Q 2011/0015* (2013.01); *H04Q 2011/0016* (2013.01)

(58) Field of Classification Search
USPC .......................................................... 398/50
See application file for complete search history.

(56) References Cited

U.S. PATENT DOCUMENTS

| | | | |
|---|---|---|---|
| 2009/0220242 A1* | 9/2009 | Ooi ..................... | H04J 14/0208 398/85 |
| 2009/0232497 A1* | 9/2009 | Archambault ...... | H04J 14/0206 398/50 |
| 2010/0202778 A1 | 8/2010 | Wisseman | |
| 2011/0085803 A1* | 4/2011 | Ji ....................... | H04J 14/0204 398/79 |
| 2014/0029942 A1* | 1/2014 | Sato ................... | H04J 14/0204 398/48 |

OTHER PUBLICATIONS

International Search Report and Written Opinion, PCT/EP2013/076565, dated Jan. 23, 2014, 10 pages.

\* cited by examiner

US 9,742,519 B2

PHOTONIC CROSS-CONNECT WITH RECONFIGURABLE ADD-DROP-FUNCTIONALITY

CROSS REFERENCE TO RELATED APPLICATIONS

This application is a 35 U.S.C. 371 national stage filing of International Application No. PCT/EP2013/076565, filed on Dec. 13, 2013, which claims priority to European Patent Application No. 13151917.5, filed on Jan. 18, 2013. The contents of the aforementioned applications are hereby incorporated by reference in their entireties.

FIELD OF THE INVENTION

The invention refers to a PHOTONIC CROSSCONNECT WITH RECONFIGURABLE ADD-DROP-FUNCTIONALITY.

BACKGROUND OF THE INVENTION

The invention is directed to a photonic cross-connect with reconfigurable add-drop functionality. Photonic, also called optical, cross-connects are based on the idea that a channel from a plurality of received WDM signals (wavelength division multiplex signals) can be redirected into any one of transmitted WDM signals. Most of the cross-connects avoid wavelength conversion, because it is cost effective at the expense of reduced signal quality, if optical-electrical conversion and 3R-regeneration are not used. Another restriction for the signal quality comes from the wavelength selective elements. These problems increase, if DWDM signals (dense wavelength division multiplex signals) are transmitted.

In future, high data-rates signals will be transported and routed through a network in frequency slots filled with a set of sub-channels at spectrally disjunctive optical frequencies. Such group of sub-channels is denoted as super-channel in the following. A super-channel is generated by combining e.g. 4 sub-channels by a pluggable module having several optical line side ports, or is generated directly by appropriate modules.

The optical cross-connect has to provide the functions to add and drop such sub-channels via tributary ports, and the function to direct the super-channels to the desired traffic directions via a direction switching unit.

PRIOR ART

A photonic cross-connect is disclosed in the patent application US 2006/0098981 A1. Each through or express channel has to pass through a WSS (wavelength selective switch) and a multiplexer. WS-switches are used for realizing cross-connect and add-drop functions. WSS functionality can be realized by different technologies. By means of these technologies, e.g. micro-electro-mechanical-systems (MEMS), liquid crystal (LC) or liquid crystal on silicon (LCOS), an optical WDM signal received by an input port can be switched frequency selective to a plurality of output ports and vice versa. The realisation of a frequency-selective switching matrix with a plurality of inputs and outputs is possible by applying these elements.

The function of a cyclic filter is explained in "N×N Cyclic-Frequency Router With Improved Performance Based on Arrayed-Waveguide Gratings", Journal of Lightwave Technology, Vol. 27, No. 18, Sep. 15, 2009.

An article "Flexible Architectures for Optical Transport Nodes and Networks" Steven Gringeri et al., IEEE Communication Magazine, July 2010 presents architectures and various cross-connect (ROADM reconfigurable optical add-drop multiplexer) implementations including colorless, directionless and contentionless add-drop structures.

In a colorless design any wavelength (signal) can be assigned to an add-drop port.

A directionless add-drop structure provides the freedom to direct a channel to any traffic direction of the cross-connect and is implemented by connecting an add-drop structure to every direction. This can be realized by e.g. adding another optical coupler to the add structure and another WSS to the drop structure.

A contentionless ROADM design removes wavelength restrictions from the add-drop portion of the ROADM node so that a transmitter can be assigned to any wavelength as long as the number of channels with the same wavelength is not more than the number of traffic directions in the node. This architecture allows that only one add-drop structure is needed in a node. An M×N WSS is the perfect fit for this architecture, since reusing a wavelength on a fiber is not possible. Today, M×N WSSs are not yet commercially available, but the function can be built using many smaller switches.

An alternative design uses optical splitters, couplers, arrays of photonic switches with small port counts, and tunable filters. In this way the number of add-drop ports is scalable, while the full flexibility of a contentionless function is maintained. It should be noted that with a colorless, directionless, and contentionless ROADM constraints on wavelength assignment are only removed from the add-drop structure.

OBJECTS AND SUMMARY OF THE INVENTION

It is an object of the present invention to provide a cross-connect arrangement to cope with the new transmission of super channels.

According to the invention complete super-channels are dropped and added to change a direction of transport. At least a cyclic filter is used in a drop-branch of a cross-connect for dividing a super-channel into sub-channels and/or at least a further cyclic filter is used in an add-branch to configure a super-channel.

BRIEF DESCRIPTION OF THE DRAWINGS

Presently preferred examples of the invention are described below with reference to accompanying drawings, where.

DETAILED DESCRIPTION OF THE INVENTION

Figure 1:
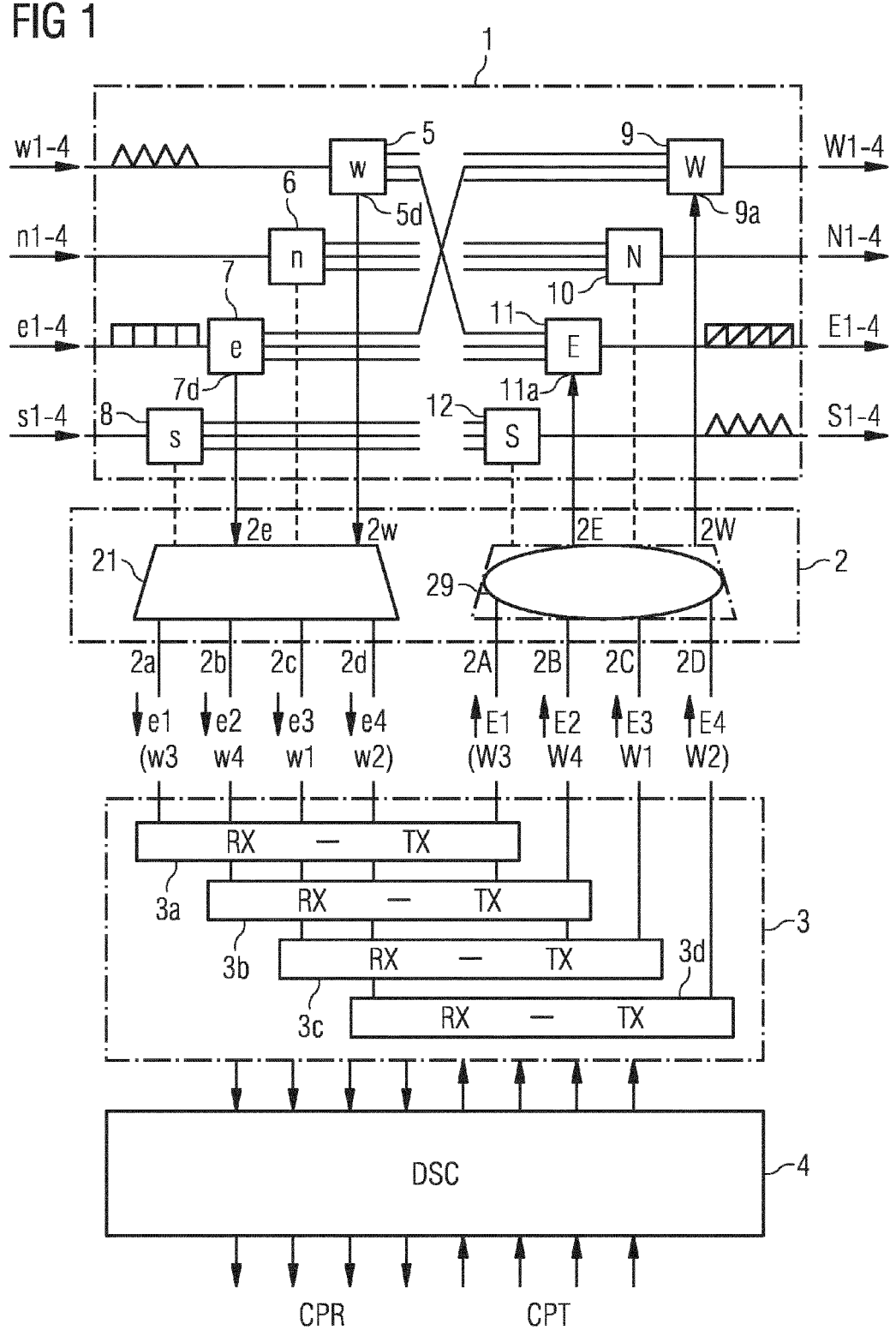
FIG. 1 shows a basic arrangement of a of a cross-connect according to the invention.

FIG. 1 illustrates a block diagram of a cross-connect. Only the functional elements relating to a basic embodiment of the invention are shown. E.g. optical amplifiers, attenuation elements, additional switches or additional filters may be inserted in the signal (channel) paths.

A cross-connector comprises a cross-connect section 1 for receiving, cross-connecting and emitting channels. The expression "channel" is used here meaning a signal which is transmitted with an adequate wavelength in this channel. Usually, a receiving part comprises drop outputs for dropping single channels (signals), and a transmitting part comprises add inputs for adding channels.

The depicted cross-connect comprises in the receiving part wavelength selective switches WSSs as distributing components 5-8 receiving super-channels from four directions w, n, e, s (west, north, east, south), and comprises in the transmitting part further WSSs as combiner components 9-12 emitting super-channels in the four directions W, N, E, S (the capital letters indicating the transmitting direction).

FIG. 1 shows for reasons of easier comprehension only representative super-channels denoted w1-4, n1-4, e1-4, s1-4 of WDM signals received from the different directions w, n, e, s. Each of the shown super-channels has the same wavelength spectrum and carries four "ultra dense" sub-channels. Each receiving distributing component 5-8 (WSS or splitter) is arranged to connect via its outputs a received super-channel to one of a plurality of inputs of one of the transmitting combiner components 9-12 (WSS or combiner). According to the received super-channels, only corresponding super-channels W1-4, N1-4, E1-4, S1-4 are emitted in different directions.

The receiving part of the cross-connect has in addition drop outputs for dropping super-channels. In the depicted basic arrangement, it is assumed that only the receiving WSSs 5 and 7 are foreseen by cabling and configuration for dropping the super-channel w1-4 at drop output 5*d* and/or the super-channel e1-4 at drop output 7*d* respectively. The dropped super-channels are referred to as "drop super-channels". The drop-outputs of the WSSs may perform a pre-selection of the drop super-channels.

Each drop output 5*d*, 7*d* is connected to an input 2*e* and 2*w* respectively of a M×N=2×4 cyclic filter 21 (M-active) inputs, N-outputs corresponding to the number of sub-channels/super-channel) arranged in an 'division-multiplex section' 2. In this embodiment, one super-channel may be dropped or both super-channels w1-4 and e1-4 may be dropped simultaneously (which can be avoided by the WSSs design or by another appropriate configuration). The cyclic filter separates and emits each of the N=4 sub-channels e1, e2, e3, e4 at a separate output: e1 at 2*a*, e2 at 2*b*, e3 at 2*c*, and e4 at 2*d*. Further each of the sub-channels w1, w2, w3, w4 is emitted cyclically shifted at a separate output: w1 at 2*c*, w2 at 2*d*, w3 at 2*a*, and w4 at 2*b*. Hence, always two sub-channels having different wavelength of two super-channels having the same frequency band are dropped at one filter output, e1 and w3 are emitted at 2*a*; e2 and w4 are emitted at 2*b*; e3 and w1 at 2*c*; e4 and w2 at 2*d*.

In case that the two super-channels have only N=2 sub-channels, two super-channels instead of one super-channel could be terminated by such a cyclic filter. Such use creates spectral blocking though: For a given direction such N=2 super-channel cannot access any frequency slot but only those which are accessible for the two cyclic filter drop ports.

A received WDM signal comprises usually a plurality of super-channels with different (higher or lower) 'periodic' frequency bands named here 'periodic' super-channels. An additional 'periodic' super-channel with a higher or lower frequency spectrum of the WDM signal incoming from the same direction may be received, selected and dropped by the allocated WSS. Then the second 'periodic' sub-channels is additional output cyclical arranged at the same cyclic filter outputs 2*a*-2*d* because the cyclic filter is periodic in a huge frequency range.

The sub-channels emitted at the same filter outputs are separated by coherent, preferable tunable receivers RX of a transponder arrangement 3. But in this embodiment only one super-channel, e.g. e1-e4, can be output by the receivers RX because of the restricted number of four transponders 3*a*-3*d*.

The transmitting part of the cross-connect section 1 is arranged to add one of two different super-channels E1-4 or W1-4, referred to as "add super-channels". In the add branch a star-coupler 29 is used for combining the sub-channels of a single add super-channel E1-4 or W1-4. If super-channel E1-4 which is inserted via an add input 11*a* of the WSS 11 on the transmitting side, the add input 9*a* of WSS 9 is closed within the frequency band of the super-channel or E1-4. But it is also possible to transmit the add super-channel in both directions E and W simultaneously.

If the other super-channel w1-4 is dropped instead of the super-channel e1-4, then an add super-channel W1-4 is added via the transmitting WSS 9.

According to an additional dropped 'periodic' super-channel an additional 'periodic' add super-channel may be added and emitted in the same direction.

The optical combiner 29 may be substituted by a further cyclic filter which is "inverse" operated as will be explained below.

In addition, this embodiment may be upgraded to drop and add additional super-channels from additional directions (dashed lines). Also, in case that each of the two super channels have only 2 instead of 4 sub-channels, all 4 sub-channels could be terminated.

Usually the dropped sub-channels (signals) emitted by the receivers are converted by a digital signal processer 4 into client signals and output at client ports CPR. The incoming client signals at client ports CPT are converted into add sub-channels/signals.

Figure 2:
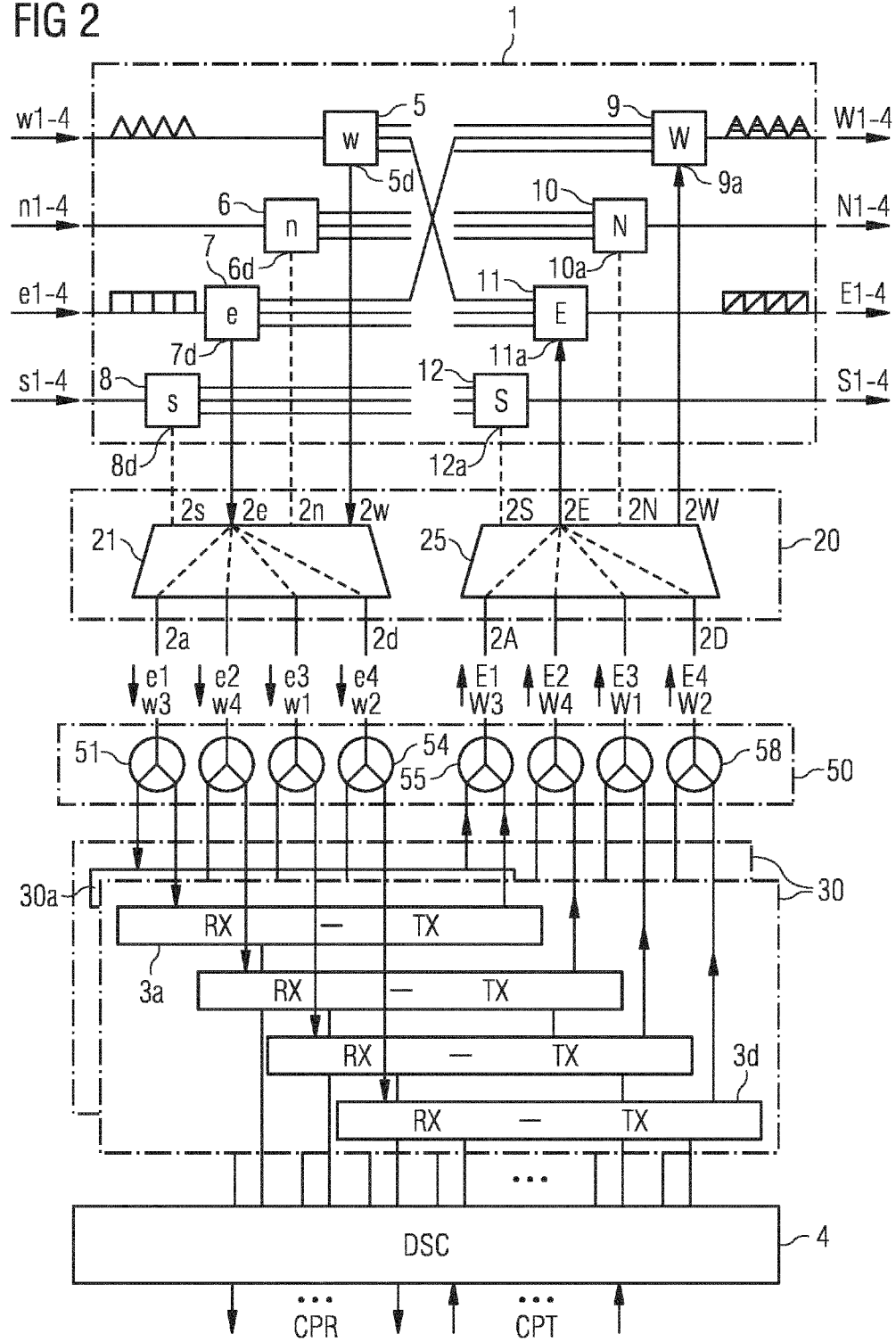
FIG. 2 shows a second embodiment of a basic arrangement of the invention dropping/adding 2 super-channels.

FIG. 2 shows a second embodiment of the invention for dropping and adding two super-channels simultaneously. Only for reasons of clarity the FIG. 2 also shows only two (of four possible) dropped and two (of four possible) added super-channels possible super. Only for reasons of easier explanation the two regarded super-channels occupy the same frequency band and are attributed to different directions. The cross-connect section 1 remains as depicted in FIG. 1.

In a second division-multiplex section 20 is the optical combiner 29 is substituted by a second cyclic filter 25.

In addition, a splitter-combiner arrangement 50 is inserted between the cyclic filters 21, 25 and an extended transponder arrangement 30. The inputs of four 1:2 splitters 51-54 are connected to filter 21 outputs 2*a*-2*d*, first outputs of the four splitters are connected to the receiver RX inputs the transponders 3*a*-3*d*, and second outputs of the splitters are connected to receiver inputs of transponders 30*a*, . . . of the expanded transponder arrangement 30.

In the add branch, first and second inputs of four 2:1 combiners 55-58 are connected to transmitter TX outputs of the transponder arrangements 30, and each cyclic filter 25 output 2W, 2E is connected to an add-input 9*a* and 11*a* respectively; shown are only these two connections for reasons of easier understanding.

It is now possible to drop and add two super-channels e1-4 and w1-4 simultaneously. The sub-channels e1-e4 and w1-w4 are now output at the same cyclic filter 21 outputs 2*a*-2*d* as specified in the drawing FIG. 2. According to their different wavelengths the sub-channels are separated by the transponders 3a-3d and 30a, . . . , 30d (30d is not shown in the drawing). The doubled quantity of tuneable receivers RX (transponders) allows to drop any two super-channels of four possible super channels at a time and to emit these sub-channels at different receiver RX outputs. Hence, the tuneable receivers imply also direction switching ability.

In the add path, the sub-channels of two super-channels E1-4 and W1-4 having the same frequency band are generated by the transmitters TX of the transponder arrangement 30. Always two of the sub-channels with different frequency bands: E1 and W3; E2 and W4; E3 and W1; E4 and W2 are combined by the combiners 55-58 and fed to the (now) 'input' ports 2A-2D of the second cyclic filter 25. This filter is "inverse operated": The sub-channels are combined forming two add super-channels E1-4, W1-4, which are emitted at the (now) 'output' ports 2E and 2W and fed to the add inputs 11a, 9a of the WSSs 11 and 9 respectively.

The shown add-drop-section may be extended to drop and add any two super-channels from and to all four directions simultaneously. The drop outputs 6d of WSS 6 and 8d of WSS 8 are then connected to further filter inputs 2s and 2n respectively as indicated by dashed lines; and the filter 25 output ports 2S and 2N are connected to add inputs 12a and 10a respectively. In the add path, according to the allocation of sub-channels and filter 25 'input' ports 2A-2D each generated super-channel can be emitted at any filter 'output' port 2S, 2E, 2N and 2W and fed to each add input 9a-12a according to the wavelength of the sub-channels. The dashed lines show the extension for dropping and adding super channels from and to all directions.

Hence, tunable transmitters TX in combination with the cyclic filter 25 imply also direction switching ability, and the arrangement can drop and add super-channels from and to all directions. But according to the splitters, combiners, and number of transponders this embodiment is restricted to drop and add only two super-channels having the same frequency band simultaneously.

Two or more super-channels having different frequency bands (super-channels of a WDM signal) may also be received from the same direction or from different directions. In this case, their sub-channels would also have different frequency bands. These 'periodic' super-channels are processed as explained regarding the embodiment of FIG. 1. A selection of the dropped and added super-channels may be performed by the WSSs. The number of dropped or added super-channels is again restricted by the number of transponders and by the number of splitter outputs and combiner inputs.

Figure 3:
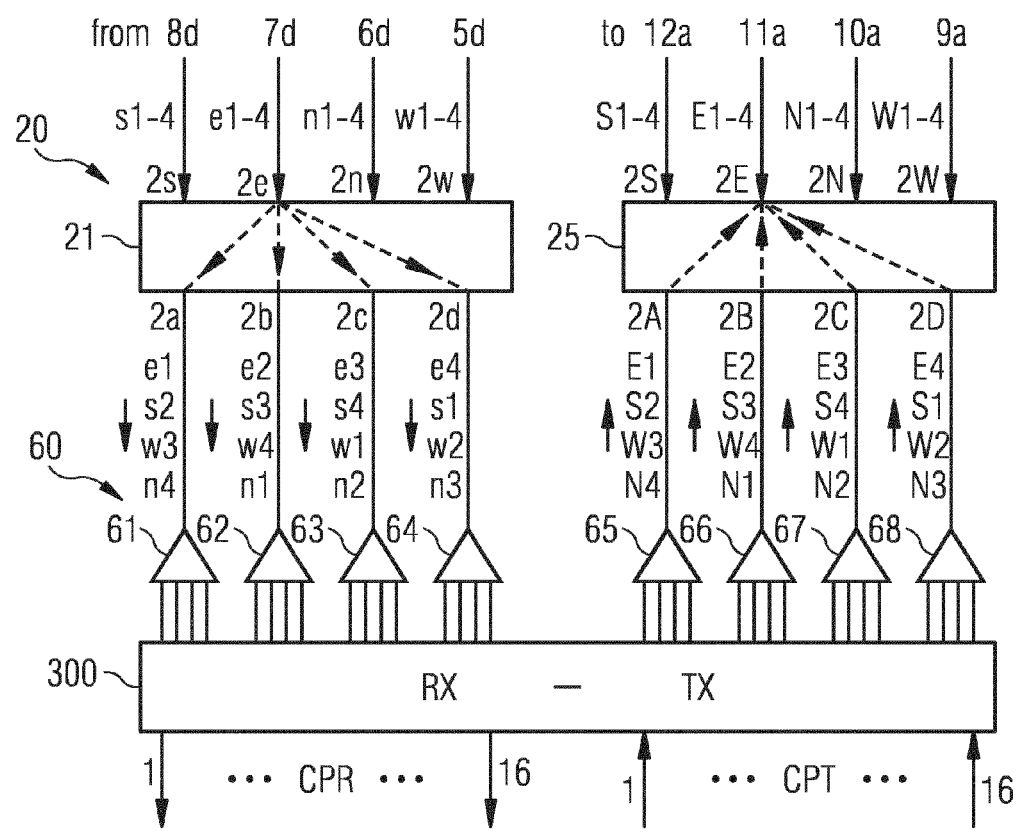
FIG. 3 shows an advanced add-drop arrangement dropping/adding 4 super-channels simultaneously.

FIG. 3 shows an embodiment extended to drop and add simultaneously four super-channels having the same frequency band or different frequency bands. These four super-channels are received from one to four directions. Again, for reasons of easier understanding, super-channels with the same frequency band received from and transmitted in the four directions are regarded.

The division-multiplex section 20 comprises again the cyclic filters 21 and 25. The drop outputs 5d, 6d, 7d, 8d of all receiving WSSs 5, 6, 7, 8 are connected to the inputs 2s, 2e, 2n, 2w of the cyclic filter 21 for dropping super-channels w1-4, n1-4, e1-4, s1-4 of all directions. The filter 21 outputs 2e-2d are now connected to inputs of N=4 splitters 61-64 (N corresponding to four sub-channels/super-channel) with M=4 outputs (M corresponding to the number simultaneously dropably super-channels) which outputs are connected to inputs of the tunable receivers RX of an enlarged transponder arrangement 300.

Now, the function of cyclic filter 21 is regarded when four super-channels with the same frequency band received from four directions are dropped. E.g. the sub-channels e1, s1, w1, n1 have the lowest frequency band within the frequency band of the super-channels, the sub-channels e2, s2, w2, n2 and e3, s3, w3, n3 have higher frequency bands, and the sub-channels e4, s4, w4, n4 have the highest frequency bands. Again, because the drop super-channels are fed to different filter inputs 2s, 2e, 2n, 2w, each filter 21 output 2a-2d emits four sub-channels having different frequency bands. The output sub-channels are listed in FIG. 3. Naturally, also all four outputs of each splitter 61-64 carry the same listed sub-channels.

The number of transponders has to be also increased according to the number of simultaneously dropped or added sub-channels. And because of the different frequency bands the 16 receivers RX of an enlarged transponder arrangement 300 can separate all 16 sub-channels of the four dropped super-channels. E.g. the sub-channels e1, e2, e3, e4 of the super-channel e1-4 are separated and converted by four receivers, each connected to one output of the four splitters 61-64 and tuned to the frequency bands of the sub-channels e1, e2, e3, e4.

Because any tuneable receiver can output any of four received sub-channels (e.g. e1, s1, w1, n4) the combination of splitters and tuneable receivers implies direction switching ability.

In the add path, the 'input' ports 2A-2D of the inverse operated filter 25 are now connected to outputs of N=4 combiners 65-68 with M=4 inputs, whereat the combiner inputs are connected to outputs of the transmitters TX of the transponder arrangement 300. The 'output' ports 2W, 2E, 2N, 2S of the further cyclic filter 25 are connected to add inputs 9a, 10a, 11a, 12a of the transmitting WSSs 9-12 to add up to four super-channels.

The transmitters TX of the enlarged transponder arrangement 300 generate sub-channels (signals) which are combined by the combiners 65-68. The output combinations of the sub-channels are listed in FIG. 3. The 'inverse' operated cyclic filter 25 receives these combinations and outputs four add super-channels S1-4, E1-4, N1-4, and W1-4.

The allocation of sub-channels forming a super-channel and filter 25 'input' ports 2A-2D determines the filter "output" port of the combined super-channel. In FIG. 3 combining sub-channels E1-E4 to form the add super-channel E1-4 is indicated by dashed lines. If the sub-channels are cyclically shifted the add super-channel E1-4 is output at a corresponding filter 25 'output' port.

Again, because the wavelengths of the sub-channels/signals are generated by the transmitters TX, the combination of tuneable transmitters TX and the cyclic filter 25 implies also switching ability.

As aforesaid, also 'periodic' super-channels may be dropped and added. And if additional 'periodic' super-channels should be dropped and added the number of transponders, the splitters and combiners have to be adapted. The digital signal converter 4 converts optical signals into client signals and vice versa.

Figure 4:
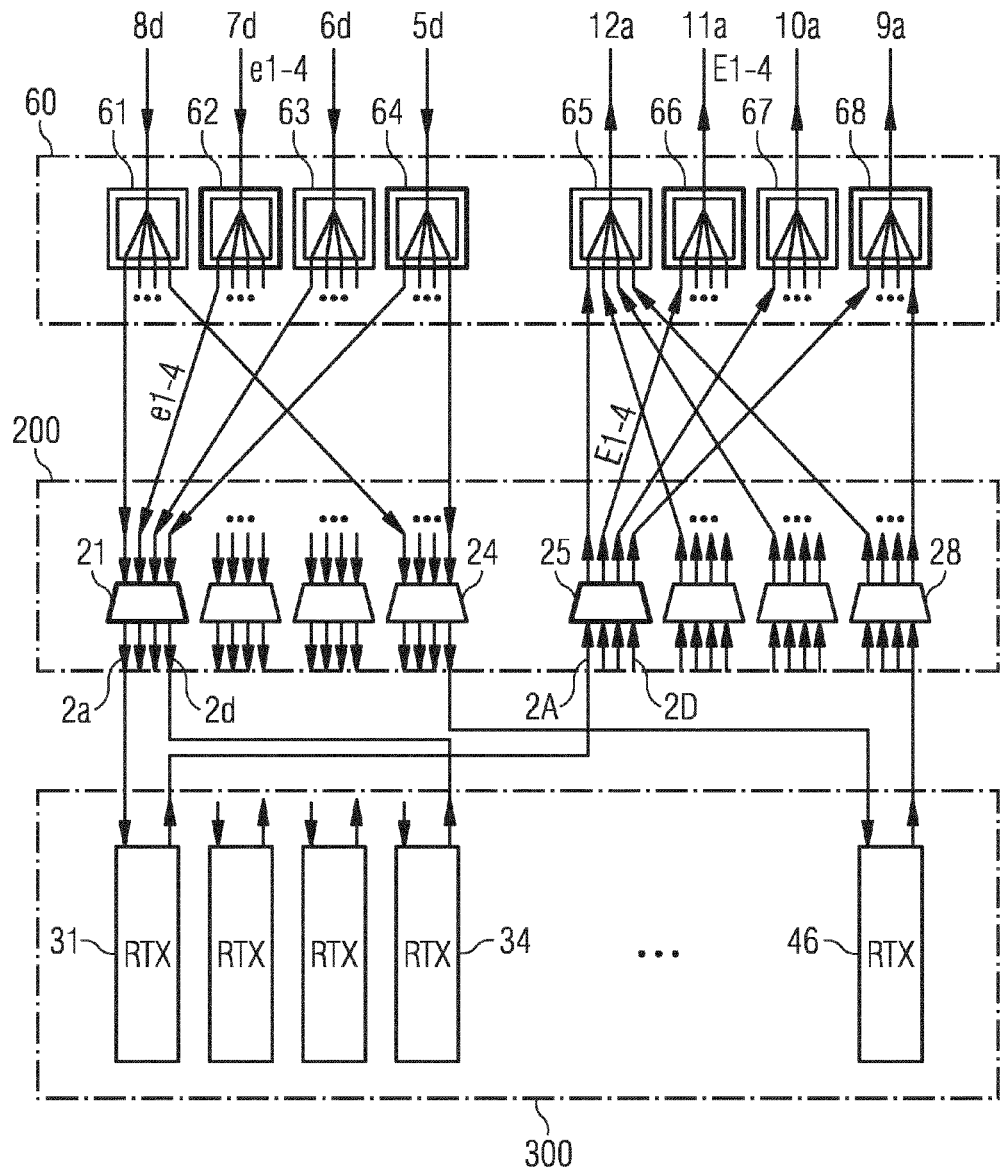
FIG. 4 shows another advanced add-drop arrangement.

FIG. 4 shows a variation of an enlarged splitter-combiner arrangement 60 and an advanced division-multiplex section 200 with corresponding flexibility. The drop path is realized with optical 1:4 splitters 61-64 and optical cyclic filters 21-24 connected downstream in series. Each drop output 5d-8d of the WSSs 5-8 is connected with an input of one optical splitter 61-64. And each output of the optical splitters is connected with an input of one of the cyclic filters 21-24. As already described, because the super-channels are fed to different filter inputs the output sub-channels are cyclically shifted at the filter outputs. Receivers of transponders (RTX) 31-46 are connected to all 16 outputs of the cyclic filters 21-24.

Hence, regarding the drop branch, each group of four transponders, e.g. 31-34, is able to select each of the four dropped super-channels (having the same frequency bands), e.g. comprising the sub-channels e1-4.

The add branch is designed according to the drop branch with four cyclic filters 25-28, receiving sub-channels from transmitters of the transponders 31-46. Each of the four outputs of each cyclic filter 215-218 is connected to an input of four combiners 25-28. And each output of the four combiners is connected to an add input 9a-12a of the WSSs 9-12 (FIG. 2).

Each cyclic filter 25-28 receives the sub-channels of a super-channel. The 'inverse' functions of the cyclic filters 25-28 are used, to combine the received sub-channels to super-channels. According to the sequential arrangement of the sub-channels at the filter ports 2A-2D, which is determined by the transponders 31-46, a super-channel is output at a certain output of the four outputs of a cyclic filter 25-28. Hence, this super-channel, e.g. E1-4, is fed to only one of the four combiners 55-58. According to the sub-channel arrangement the generated super-channel can be output at any of the cyclic filter ports and fed to any of the transmitting WSSs. In other words, the cyclic filters in combination with tunable transmitters/receivers are used as direction switching matrix.

The output of each combiner 65-68 is connected to one add input of the WSSs 9-12. According to this embodiment each of the four added super-channels can be send in each direction.

If less super-channels have to be dropped simultaneously, the number of splitter outputs/combiner inputs and the number of cyclic filters can be reduced. And if only channels from/to certain directions have to be dropped/added the number of splitters and combiners can be also reduced.

The present invention is not limited to the details of the above described principles. The drop branch and add branch may be extended by additional or modified cyclic filters and additional splitters and combiners for dropping additional super-channels from and to additional directions. The number of transceivers has to be enlarged to drop and add a greater number of signals. The scope of the invention is defined by the appended claims and all changes and modifications as fall within the equivalents of the scope of the claims are therefore to be embraced by the invention.

REFERENCE SIGNS

1 cross-connect section
2 division-multiplex section
3 transponder arrangement
3, 31 transponder arrangements
4 digital signal converter
5-8 (distributer components; receiving wavelength selective switches
9-12 combiner components; further wavelength selective switches
5d-8d drop outputs
13 cyclic filter
3a-3d, 30a transponder
31-46 transponder
9a-12a add input
20 division-multiplex section
200 enlarged division-multiplex section
21-24 cyclic filter
25-28 further cyclic filter
29 optical combiner
30 extended transponder arrangement
50 splitter-combiner arrangement
60 enlarged splitter-combiner section
30 extended
300 enlarged transponder arrangement
80 advanced splitter-combine arrangement
e1-4 super-channel from direction east
e1, e2, e3, e4 sub-channels
n1-4 super-channel from direction east
s1-4 super-channel from direction south
w1-4 super-channel from direction west
2e, 2w (used) cyclic filter inputs
2a, 2b, 2c, 2d cyclic filter outputs
E1-4 super-channel emitted in direction E (east)
E1, E2, E3, E4 add sub-channels of E1-4
N1-4 super-channel in direction north
S1-4 super-channel in direction south
W1-4 super-channel in direction west
2A-2D further cyclic filter input ports
2S, 2E, 2N, 2W further cyclic filter output ports

The invention claimed is:

1. A photonic cross-connector comprising a cross-connect section with a receiving part including first distributer components receiving incoming super-channels, each represented by a group of sub-channels, and at least two drop outputs, each for dropping at least one drop super-channel, and comprising a transmitting part including further combiner components receiving express signals from the receiving part and emitting outgoing WDM signals and having at least two add-inputs for adding at least an add super-channels, the cross-connect further comprising
    a division-multiplex section, having inputs that are connected to the at least two drop outputs of the receiving part, with a cyclic filter, each filter input receiving a drop super-channel and outputting sub-channels from said super-channels cyclically shifted at filter outputs such that sub-channels from super-channels having a same frequency band and outputted at a same output have different wavelengths;
    a transponder arrangement with receivers, each receiving at least a sub-channel from one of said filter outputs of the cyclic filter, whereat each receiver is tunable for extracting one sub-channel, and with transmitters, each outputting a sub-channel fed to an optical combiner outputting said add super-channels fed to at least two add inputs of said transmitting part of the cross-connect section, whereat each transmitter is tuneable for generating a sub-channel of an add super-channel.

2. A photonic cross-connector according to claim 1, wherein the receiving part of the cross-connect section comprises as distributer component wavelength selecting switches and the transmitting part of the cross-connect section comprises as combiner components further wavelength selecting switches.

3. A photonic cross-connector according to claim 2, comprising
    at least two wavelength selecting switches of the receiving part with drop outputs, each arranged for outputting at least one drop super-channel and
    at least two of the further wavelength selecting switches of the transmitting part with add inputs, each arranged for receiving at least one add super-channel.

4. A photonic cross-connector according to claim 1, wherein outputs of the receivers and inputs of transmitters are connected via a digital signal converter with client ports.

5. A photonic cross-connector according to claim 1, wherein one add super-channel emitted from the transmitters is fed via a star coupler as optical combiner to add-inputs of the further wavelength selecting switches.

6. A photonic cross-connector according to claim 1, wherein the at least one add super-channel emitted from the transmitters is fed via a further cyclic filter with inverse function as optical combiner to at least two add-inputs of the further wavelength selecting switches.

7. A photonic cross-connector according to claim 6, wherein
the outputs of the cyclic filter are connected via splitters to receiver inputs of an extended transponder arrangements for selecting simultaneously sub-channels of at least two drop super-channels; and
the transmitter outputs of the extended transponder arrangements are connected via combiners to input ports a further cyclic filter with inverse function as combination element for outputting at least two add super-channels.

8. A photonic cross-connector according to claim 7, wherein
the cyclic filter in the drop path comprises M inputs and N outputs;
the further cyclic filter in the add path comprises N input ports and M output ports;
an enlarged splitter-combiner arrangement comprises N splitters, which inputs are connected to the cyclic filter outputs and which outputs are connected to receiver inputs, and further comprises N combiners, which inputs are connected to transmitter outputs and which output ports are connected to add inputs;
an enlarged transponder arrangement comprises a number of transponders corresponding to the maximum number of simultaneously able to be dropped sub-channels;
whereat M is the number of simultaneously able to be dropped/able to be added super-channels, and N is the number of sub-channels of a super-channel.

9. A photonic cross-connector according to claim 1, wherein
an enlarged splitter-combiner arrangement comprises a plurality of at least M splitters, which inputs are connected to drop outputs and which outputs are connected to inputs of M cyclic filters, and wherein N outputs of the cyclic filters are connected to inputs of the tunable receivers of transponders;
wherein outputs of the tunable transmitters of the transponders are connected to 'input' ports of M further inverse working cyclic filters, which output ports are connected to inputs of at least M combiners, and wherein outputs of the combiners are connected to add-inputs of the transmitting WSSs;
whereat M is the number of add/drop-ably super channels; N is the number of sub-channels/super-channel.

10. A photonic cross-connector according to claim 1, wherein each cyclic filters has M=4 inputs and N=4 outputs and/or each splitter has 4 outputs and each combiner has 4 inputs.

11. An optical transmission system comprising at least one photonic cross-connector according to claim 1.

* * * * *